United States Patent [19]
Orita et al.

[11] Patent Number: 4,658,429
[45] Date of Patent: Apr. 14, 1987

[54] SYSTEM AND METHOD FOR PREPARING A RECOGNITION DICTIONARY

[75] Inventors: Miyahiko Orita; Yoshiki Kobayashi; Yutaka Kubo, all of Hitachi, Japan

[73] Assignee: Hitachi, Ltd., Tokyo, Japan

[21] Appl. No.: 687,757

[22] Filed: Dec. 31, 1984

[30] Foreign Application Priority Data

Dec. 29, 1983 [JP] Japan .................. 58-248151
Dec. 29, 1983 [JP] Japan .................. 58-248152

[51] Int. Cl.$^4$ ............................................. G06K 9/64
[52] U.S. Cl. ................................................. 382/36
[58] Field of Search ......................... 382/36, 37, 38, 6

[56] References Cited

U.S. PATENT DOCUMENTS 3,601,803  8/1971  Ullmann ................... 382/36
4,503,557  3/1985  Maeda .................... 382/36

OTHER PUBLICATIONS

G. J. Agin et al., "SRI Vision Research for Advanced Industrial Automation", Second USA-Japan Computer Conference, pp. 113-117, 1975.

Primary Examiner—Stephen A. Kreitman
Attorney, Agent, or Firm—Antonelli, Terry & Wands

[57] ABSTRACT

For the preparation of a tree structure recognition dictionary, a feature set at each node of the tree should be the feature giving the largest discrete distribution number. When elements of an object are classified or divided into categories, if the number of combinations of subgroups, which are discrete, is the largest, the classification is the most effective. This classification is effected, when the distance between distributions for a certain feature is larger than a predetermined value.

9 Claims, 24 Drawing Figures

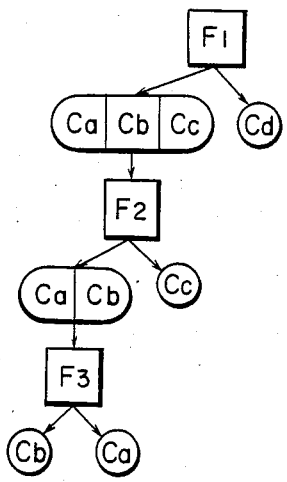
PRIOR ART
FIG. 2a
{SEPARABILITY, STABILITY COEFICIENT}
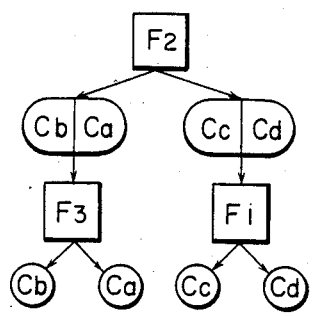
PRIOR ART
FIG. 2b
{ VARIANCE RATIO }
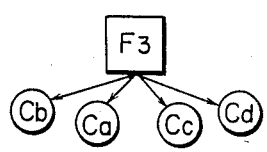
FIG. 2c
{DISCRETE DISTRIBUTION NO.}
FIG. 3
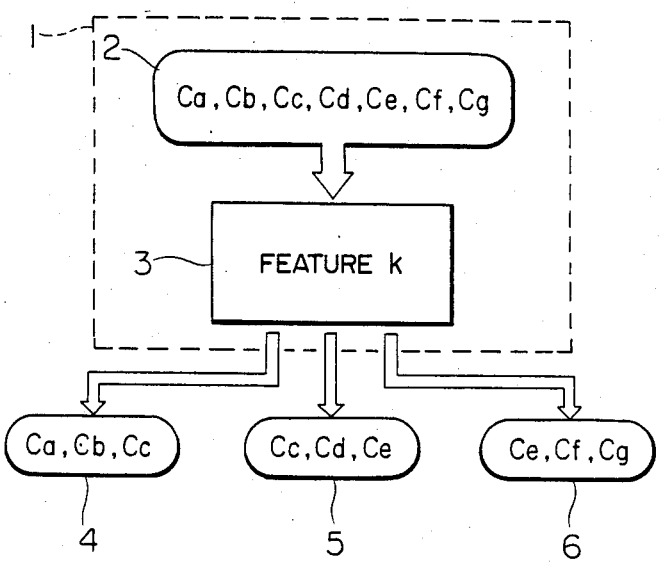

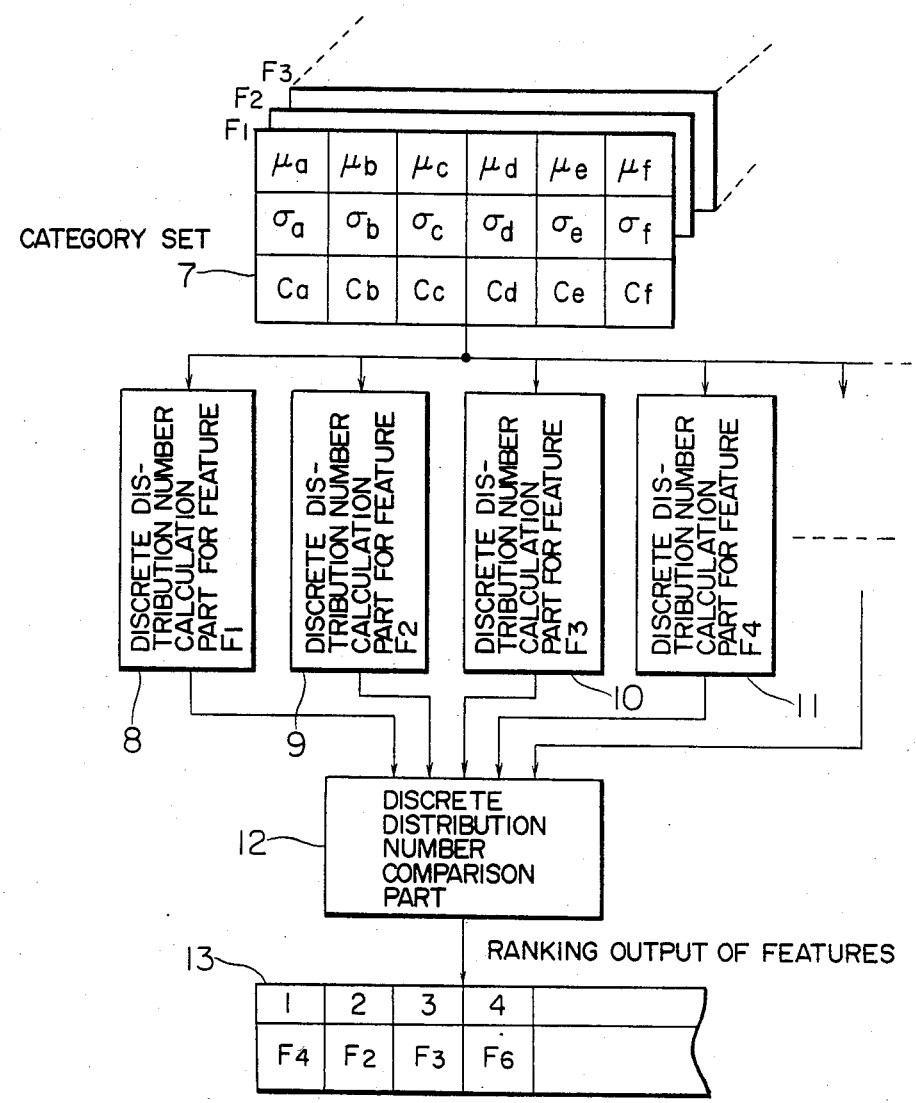
FIG. 5a  RANKING OF FEATURES

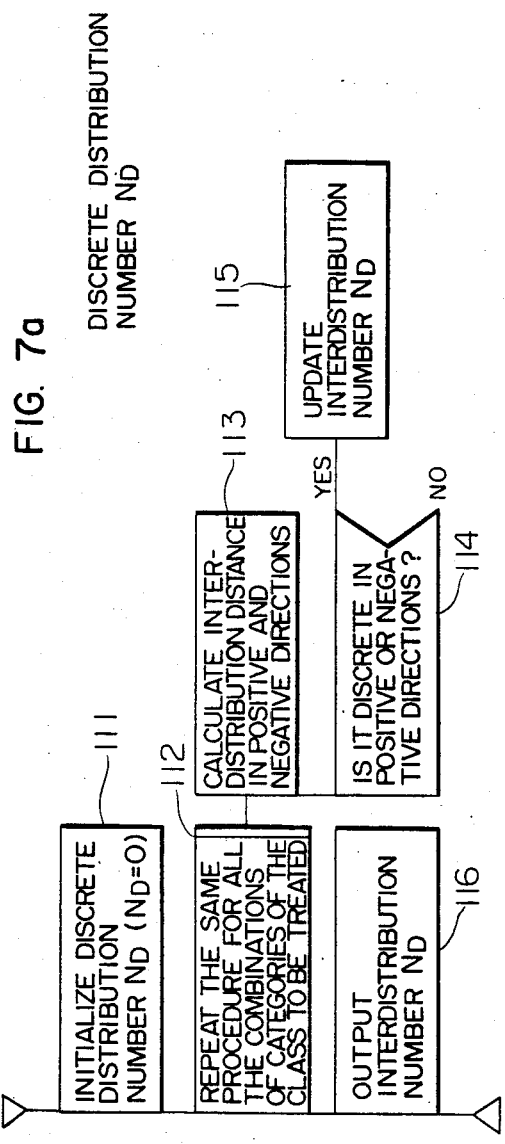
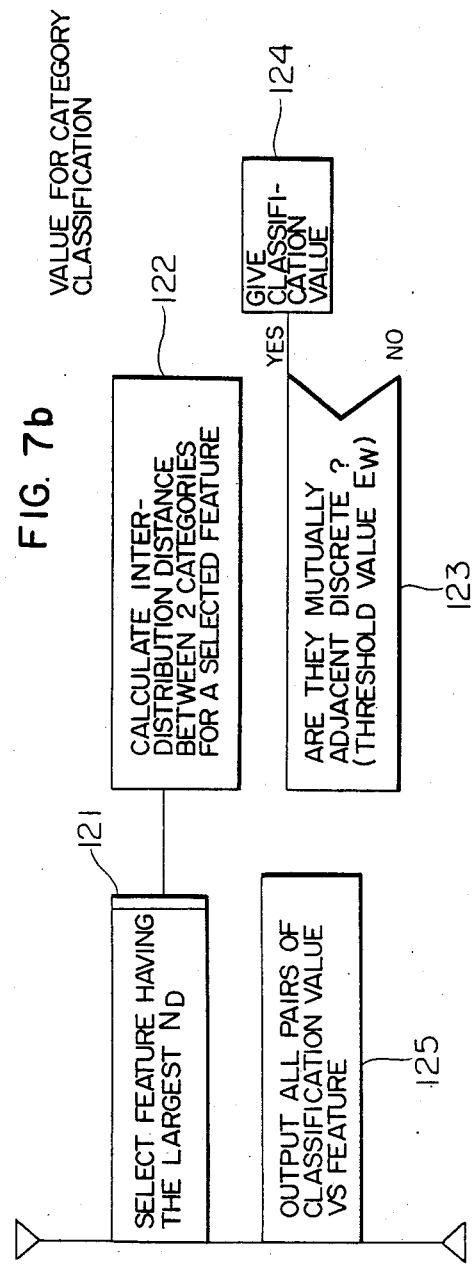
FIG. 7a
FIG. 7b

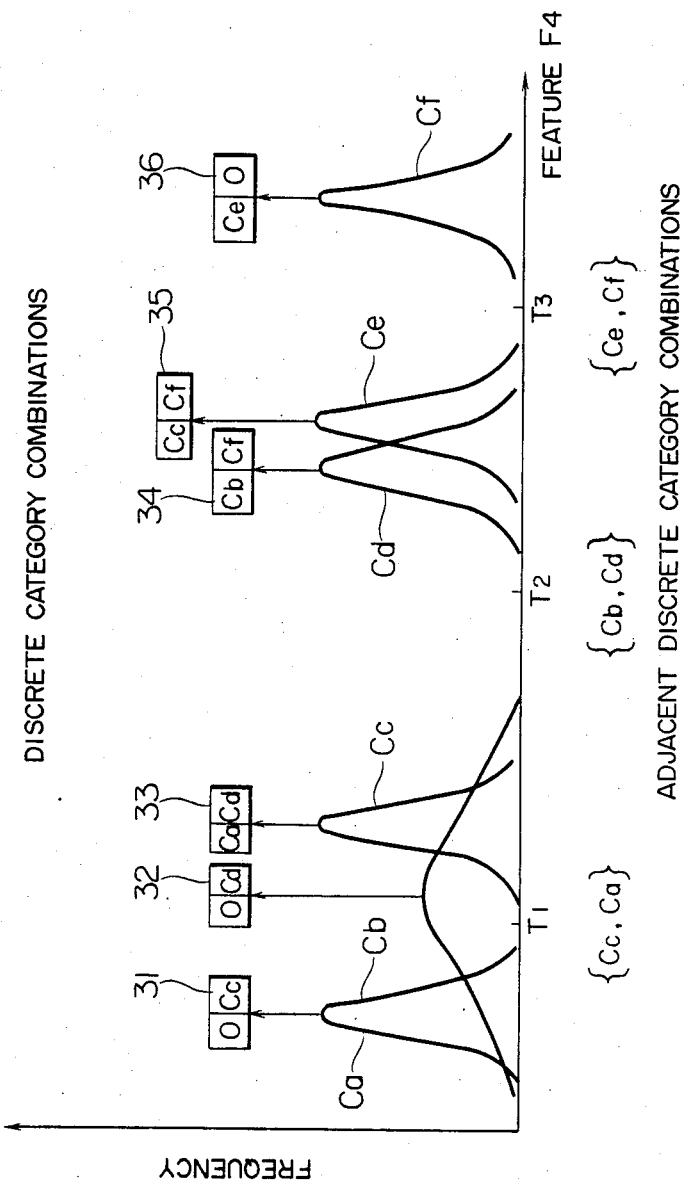

NAME OF DISEASE: BACILLARY DYSENTERY

NAME OF DISEASE: INFLUENZA

| FEATURE | MEAN VALUE | STANDARD DEVIATION |
|---|---|---|
| 73 — BLOOD PRESSURE | 90 | 20 |
| 74 — NUMBER OF PULSES | 60 | 5 |
| 75 — BLOOD PH | | |
| URINARY PROTEINS | | |
| BODY TEMPERATURE | | |
| ⋮ | ⋮ | ⋮ |

FIG. 13a
PRIOR ART
FIG. 13b
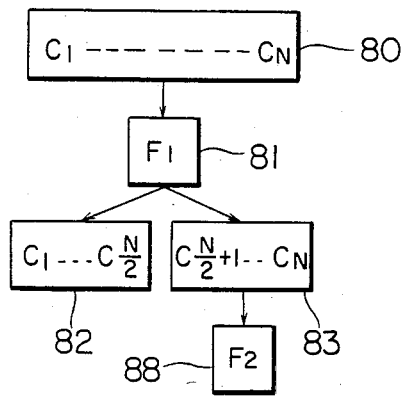
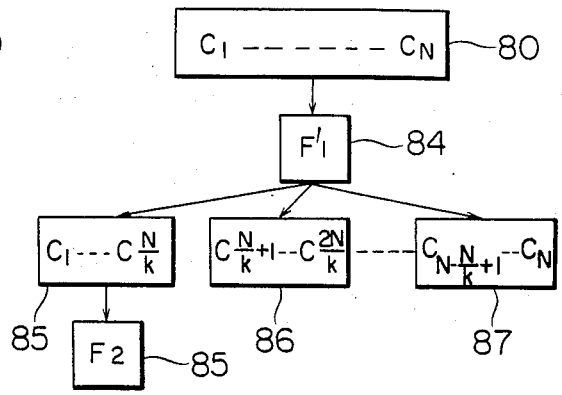
FIG. 13c
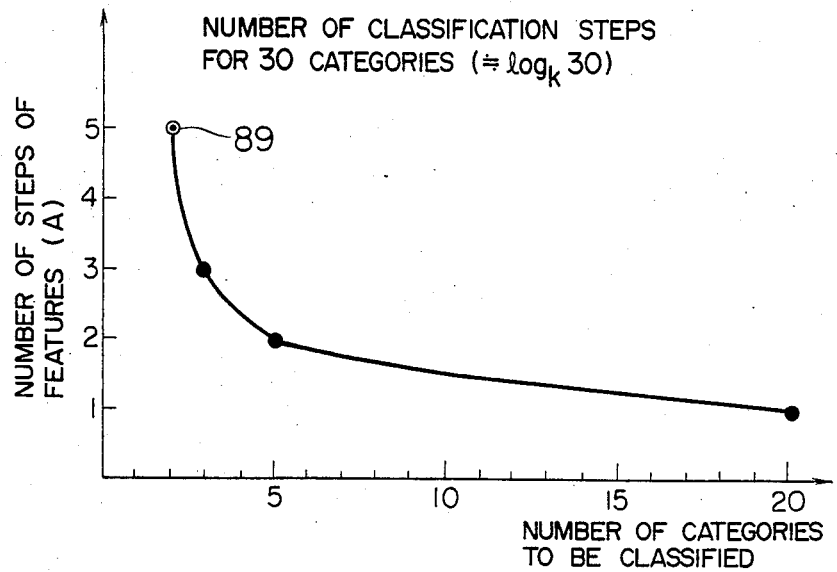

SYSTEM AND METHOD FOR PREPARING A RECOGNITION DICTIONARY

BACKGROUND OF THE INVENTION

1. Field of the Invention

This invention relates to a recognition system and method for category classification, which constitutes a problem when a recognition dictionary or a decision tree structure should be automatically prepared. Specifically, the invention relates to a recognition system and method for category classification permitting classification of a plurality of categories or classes for a certain feature (into small groups consisting of the smallest unit, while maintaining a satisfactory security) in a period of time as short as possible (whatever is the distribution situation of the plurality of categories which are objects of each of the nodes of the tree).

2. Description of the Prior Art

The classification of the tree structure is described in "SRI VISION RESEARCH FOR ADVANCED INDUSTRIAL AUTOMATION" by Gerald J. AGIN and Richard O. DUDA, Second USA-JAPAN Computer Conference, 1975.

In general, identification of a pattern or object which is to be recognized is effected on the basis of a recognition dictionary previously prepared. The recognition dictionary is prepared b analyzing distribution data of every category or class after having several times extracted various features for each of the objects to be recognized. In this case it is desirable to prepare automatically the recognition dictionary mentioned above by a certain standardized method in order to alleviate analysis work and to exclude the subjectivity of the analyzer. As a structure of the recognition dictionary, the structure realizing identification by means of a decision tree (decision tree structure dictionary), which attaches importance to treatment speed, is the most prominent. However a problem which is always confronted always at the time of the preparation of the decision tree structure dictionary is how the ranking of features should be decided in order to evaluate the features which are to be given to each of the nodes of the tree and how a plurality of categories, which are objects to be recognized, can be classified into a plurality of small groups while maintaining their reliability, i.e. security, on the axis of the features which are to be given to each of the nodes of the tree. Hereinbelow the division of the plurality of categories, which are objects to be recognized, at the gaps in their distribution into small groups on the feature axis mentioned above is called category classification. To classify the objects into a plurality of small groups while maintaining security is used here in the meaning that where the frequency is small in the frequency distribution, although there exists mutual interference or distribution superposition between different categories, it is neglected and they are decided or judged to be independent.

Known methods for feature ranking are known the separability method (e.g. "Oyo gazo kaiseki (Applied image analysis) by Jumpei Tsujiuchi, Kyoritsu Shuppan Co., Ltd.), the stability coefficient method (e.g. Provisional publication of patent application No. 25078/1982), and the variance ratio method (e.g. "Mathematical study on feature extraction in the pattern recognition (in Japanese)" by Otsu, Electrotechnical Laboratory Headquarters Research Report No. 818.) Hereinbelow each of them will be briefly explained.

Suppose now that category groups, which are to be classified (identified) are $C_a$–$C_d$ as indicated in FIGS. 1a, 1b and 1c and that features prepared for them are $F_1$–$F_3$. The frequency distribution concerning a feature $F_1$ of a plurality of samples of objects contained in a category $C_a$, i.e. the mean value $\mu_a$ and the standard deviation $\sigma_a$, can be obtained. The mean value and the standard deviation of the other categories $C_b$–$C_d$ are also obtained, as indicated in FIG. 1a. Also for the features $F_2$ and $F_3$ their frequency distribution is obtained, as indicated in FIGS. 1b and 1c, respectively. (The value $D_c$ obtained according to this invention and indicated in the figures will be described later.) As a feature, e.g. for a circular part, the length of its periphery can be used. Different distribution curves as indicated in FIGS. 1a–1c are obtained due to fluctuations in light intensity, i.e. brightness, on the circular part.

(I) Separability method

Values for evaluation of features, called separability, for $F_1$–$F_3$ are calculated and one of them having a large separability is used for the categories $C_a$–$C_d$ in FIGS. 1a–1c. Here the separability $SP(C_k \cdot C_{k+1})$ is represented by Eq. (1).

$$C_k \cdot C_{k+1} = \frac{|\mu_{k+1} - \mu_k|}{\sigma_{k+1} + \sigma_k} \quad (1)$$

where $\mu_k$: mean value of the category $C_k$ for the feature $F_i$, $\mu_{k+1}$: mean value of the category $C_{k+1}$ which is adjacent to $C_k$ (category whose mean value is next larger)

$\sigma_k$: standard deviation of the category $C_k$ for the feature $F_1$, and $\sigma_{k+1}$: standard deviation of the category $C_{k+1}$ which is adjacent to $C_k$.

The separability is calculated for each of the distribution data indicated in FIGS. 1a–1c (e.g. the mean value of the category $C_a$ for the feature $F_1$, $\mu_a = 1$ and the standard deviation $\sigma_a = 1$ are shown in the figure). For example, 3 values of the separability of $F_1$ for each category are obtained for 3 pairs of categories, which are adjacent to each other, $C_a$–$C_b$, $C_b$–$C_c$ and $C_c$–$C_d$. Among them the separability data having the largest value is obtained a follows.

$$\overline{C_c \cdot C_d(F_1)} = \frac{|\mu_c - \mu_d|}{\sigma_c + \sigma_d} = \frac{|3 - 11|}{1 + 1} = \frac{8}{2} \quad (1b)$$

The value of the separability for each of the features $F_1$, $F_2$ and $F_3$ is given in FIGS. 1a–1c.

(II) Stability coefficient method

The stability coefficient is calculated for $F_1$–$F_2$ and one of the features, whose stability coefficient is large, has priority. Further, the stability coefficient can be represented by Eq. (2).

$$ST = \sum_{k=1}^{K} \frac{\mu_{k+1} - \mu_k}{(\sigma_{k+1}^2 + \sigma_k^2)^{\frac{1}{2}}} \quad (2)$$

(All the notations $\mu_k$, $\mu_{k+1}$, $\sigma_k$ and $\sigma_{k+1}$ are identical to those used for the separability method.)

For example, $ST(F_1)$ for the feature $F_1$ can be calculated as follows.

$$ST(F_1) = \sum_{k=1}^{3} \frac{\mu_{k+1} - \mu_k}{\sqrt{(\sigma_{k+1}^2 + \sigma_k^2)}} =$$

$$\frac{\mu_b - \mu_a}{\sqrt{\sigma_b^2 + \sigma_a^2}} + \frac{\mu_c - \mu_b}{\sqrt{\sigma_c^2 + \sigma_b^2}} + \frac{\mu_d - \mu_c}{\sqrt{\sigma_d^2 + \sigma_c^2}} =$$

$$\frac{1 + 1 + 8}{\sqrt{2}} = \frac{10}{\sqrt{2}}$$

(III) Variance ratio method

The division of the variance of mean values by the mean value of variances, i.e. the variance ratio is calculated for $F_1$–$F_3$ and one of the features, whose variance ratio is large, has priority. Further, the variance ratio VR can be represented by Eq. (3).

$$VR = \frac{\frac{1}{K} \sum_{k=1}^{K} (\mu - \mu_k)^2}{\frac{1}{K} \sum_{k=1}^{K} \sigma_k^2} \quad (3)$$

where $\mu_k$: mean value of a category k, $\sigma_k^2$: square of the standard deviation of the category k, K: number of categories which are to be classified, and $\mu$: mean value of all the categories.

For example for $F_1$ the following values are found.

$\mu_1 = \mu_a = 1, \mu_2 = \mu_b = 2, \mu_3 = \mu_c = 3,$ $\mu_4 = \mu_d = 11, \sigma_1 = \sigma_2 = \sigma_3 = \sigma_4 = 1,$ $\mu = \frac{1 + 2 + 3 + 11}{4} = \frac{17}{4}$, and $$VR(F_1) = \frac{\frac{1}{4} \sum_{k=1}^{4} \left( \frac{\mu_a + \mu_b + \mu_c + \mu_d}{4} - \mu_k \right)^2}{\frac{1}{4} \sum_{k=1}^{4} \sigma_k^2}$$

$$= \frac{\sum_{k=1}^{4} \left( \frac{17}{4} - \mu_k \right)^2}{4}$$

$$= \frac{\left(\frac{17}{4} - 1\right)^2 + \left(\frac{17}{4} - 2\right)^2 + \left(\frac{17}{4} - 3\right)^2 + \left(\frac{17}{4} - 11\right)^2}{4}$$

$$= \frac{13^2 + 9^2 + 5^2 + 27^2}{64}$$

$$= \frac{1004}{64} = 15.6$$

The features $F_1$–$F_3$ being evaluated by the method described above and 3 values for each category being inscribed, the curves as indicated in FIGS. 1a–1c are obtained. According to the figures, in FIG. 1c, $F_3$ can be clearly classified into 4 categories. ($F_3$ is the most effective.) To the contrary, according to the methods (I), (II) and (III), either $F_1$ or $F_2$, which is the feature having the largest value, has the priority (i.e. either one of them is selected), because according to (I) and (II) the characteristic value is large, in the case where one category such as $C_d$ in $F_1$ is far away from the distribution groups for the other categories, and according to (III) it is large, in the case where all the categories are divided roughly into 2 groups.

The decision tree dictionary obtained by these methods are shown in FIGS. 2a, 2b and 2c. At first, the ranking of the features is decided for $C_a$, $C_b$, $C_c$ and $C_d$, depending on their separability and their stability coefficient, and it is found that $F_1$ is predominant. Then, since it is between $C_c$ and $C_d$ that the distribution can be divided safely on the axis of $F_1$, it is divided into 2 groups, one consisting of $C_a$, $C_b$ and $C_c$ and the other consisting only of $C_d$, as indicated in FIG. 2a. Next, the ranking of the features is decided for $C_a$, $C_b$ and $C_c$ and it is found that $F_2$ is predominant. Repeating analogous procedures, it is possible to classify the distribution into 4 categories which are separated from each other, as indicated in FIG. 2a. (This procedure is analogous for the variance ratio method.)

At present, in the pattern recognition using features, processing time necessary for one feature calculation is about 20–100 ms. On the other hand, processing time necessary for dividing the categories into 2 groups by using a certain dividing value is about 220 $\mu$s. Consequently it is necessary to keep the number of steps of the feature calculation used for the output of the recognition result as small as possible. Here the number of steps of feature calculation means the number of nodes or node steps necessary until the termination of one identification. Recognition treatment by one node step signifies the case where a plurality of categories, which are objects to be identified, can be all identified, i.e. separated, by one node, e.g. as shown in FIG. 2c. Consequently, since processing time is proportional to the number of features used for outputting a recognition result, the number of features should be as small as possible. It is 3 for FIGS. 2a and 2b. If possible, it is better to terminate the recognition only by $F_3$, as indicated in FIG. 2c. That is, according to a prior art method, since the dividing performance of a feature is not represented suitably, the ranking of features cannot be effected stably. Consequently it prepares an ineffective decision tree dictionary and as a result it lengthens recognition treatment time.

SUMMARY OF THE INVENTION

An object of this invention is to provide a device and method having a high dividing performance for categories, which are objects to be divided, at the time of the preparation of a decision tree structure recognition dictionary, regardless of the distribution state of the categories.

Another object of this invention is to provide a device and method permitting classification of a plurality of categories for a certain feature into small groups consisting of the smallest unit, while maintaining a satisfactory security, regardless of the distribution situation of the value of each element of the categories, which are objects to be divided, on a given feature axis for the category classification constituting a problematical point at the time of the preparation of a decision tree structure recognition dictionary.

Still another object of this invention is to provide a device and method permitting shortened processing time necessary for the category classification in an on-line recognition operation by reducing the number of node steps of the tree structure in a recognition dictionary prepared by using training samples prior to the on-line recognition operation.

This invention discloses a device and method, wherein a frequency distribution is obtained for each of a plurality of features for a plurality of categories corresponding to objects or patterns to be identified; discrete distribution numbers representing the sum of numbers of combinations of 2 categories which don't interfere with each other from the category distribution obtained for each of the features are calculated; a feature having a distribution number as large as possible is selected among said discrete distribution numbers thus obtained; and the objects or patterns are recognized by using the selected feature as a feature for the object or pattern recognition.

BRIEF DESCRIPTION OF THE DRAWINGS

FIGS. 2a–2c are schemes showing examples of the decision tree structure recognition dictionary.

FIG. 3 is a scheme for explaining a category classification at a certain node.

FIGS. 5a and 5b are block diagrams showing procedure in embodiments of the invention.

FIGS. 7a and 7b are flowcharts for explaining the operation in an embodiment according to this invention.

FIG. 8 is a scheme for explaining the discovery of a phenomenon which has motivated this invention.

FIGS. 13a–13c show a comparison of recognition between the prior art and one embodiment of the invention.

DESCRIPTION OF THE PREFERRED EMBODIMENTS

Figure 1A:
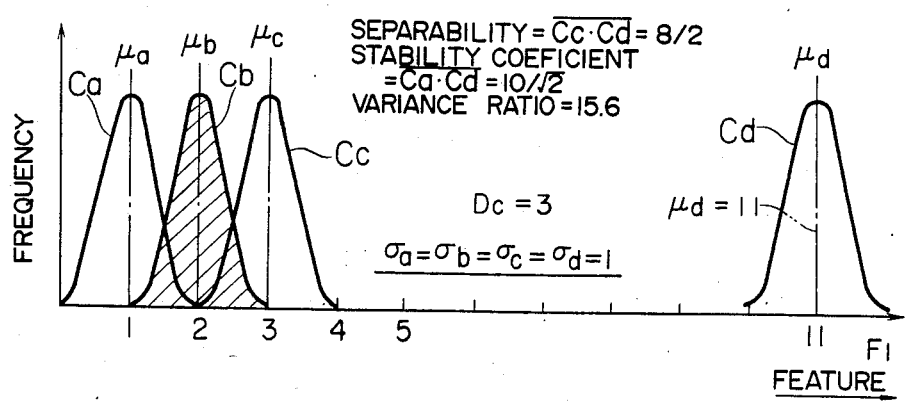
FIGS. 1a–1c are schemes for explaining examples of the feature distribution and results of the ranking of features.

Prior to the explanation of the embodiments of the invention, basic matters relating to this invention will be explained. A feature can be evaluated depending on the number into which a category, which is the object to be recognized, is divided, when the feature is used. This is explained referring to FIG. 3.

Suppose now that a category 2, which is to be identified at an arbitrary node 1 of a decision tree, is represented by $C_a$–$C_g$ and that by using a certain feature 3, it is divided into 3 groups, one group 4 consisting of $C_a$, $C_b$ and $C_c$, one group 5 consisting of $C_c$, $C_d$ and $C_e$ and one group 6 consisting of $C_e$, $C_f$ and $C_g$. This dividing method will be described specifically in the explanation of an embodiment stated later.

The content of this division can be arranged as follows.

(a) $C_a$ is separated (classified) from $C_d$, $C_e$, $C_f$ and $C_g$.
(b) $C_b$ is separated (classified) from $C_d$, $C_e$, $C_f$ and $C_g$.
(c) $C_c$ is separated (classified) from $C_f$ and $C_g$.
(d) $C_d$ is separated (classified) from $C_a$, $C_b$, $C_f$ and $C_g$.

That is, it will be understood that a classification, of a category by means of a feature consists of a plurality of combinations of the classifications of two categories. Consequently, the ranking of features is possible, based on the number of combinations $D_c$ of two categories, which can be separated from each other. The number of combinations can be counted e.g. for the example indicated in FIG. 1, as follows. The number of combinations for $F_1$, $D_c=3$, because $C_d$–$C_a$, $C_d$–$C_b$ and $C_d$–$C_c$. For $F_2$, $D_c=4$, because $C_b$–$C_c$, $C_b$–$C_d$, $C_a$–$C_c$ and $C_a$–$C_d$, and for $F_3$, $D_c=6$ (largest), because $C_b$–$C_a$, $C_b$–$C_c$, $C_b$–$C_d$, $C_a$–$C_c$, $C_a$–$C_d$ and $C_c$–$C_d$. That is, it is concluded that $F_3$ is the most effective feature. This is not a special phenomenon, which is valid only for the distribution indicated in FIG. 1, but however complicated a category to be classified is distributed, the classifying performance and the number of combinations (hereinbelow called discrete distribution number) correspond suitably to each other. This invention is based upon the discovery of this phenomenon.

Figure 4A:
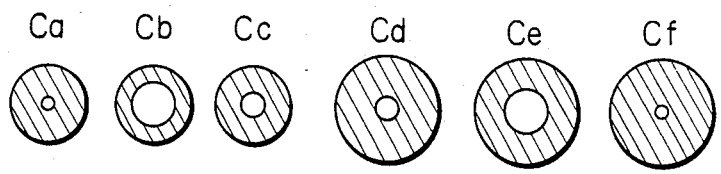
FIG. 4a is a representation of each of elements in embodiments according to this invention.
Figure 4B:
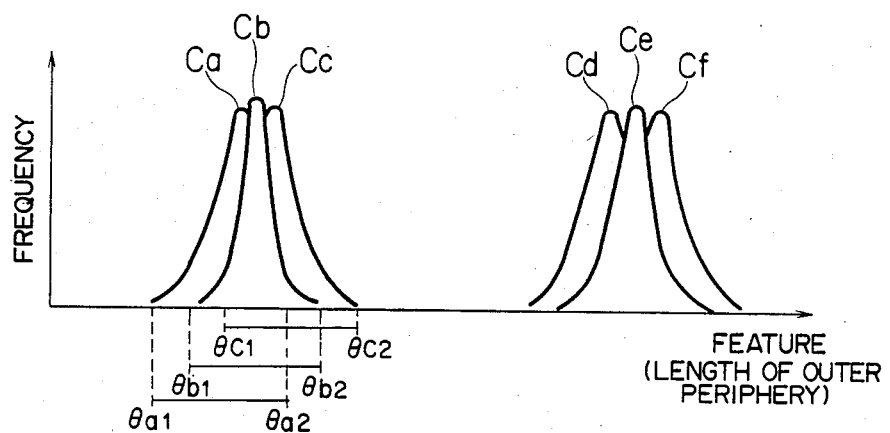
FIGS. 4b and 4c are schemes representing the distribution of features for explaining embodiments according to this invention.
Figure 4C:
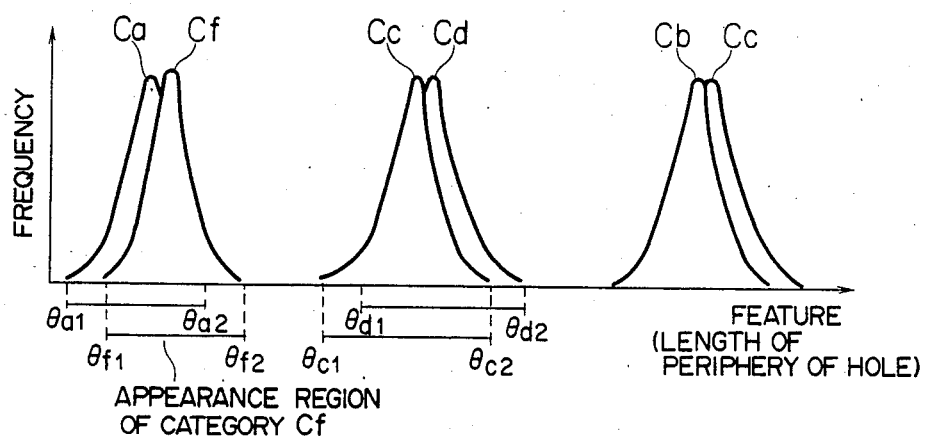

Following the explanation of these fundamental matters described above, some embodiments of this invention will be explained, referring to FIGS. 4–7. Consider now an example for recognizing 2-value patterns of 6 categories $C_a$–$C_f$ as indicated in FIGS. 4a, 4b and 4c. Here it is supposed that features $F_1$–$F_k$ are calculated several times for $C_a$–$C_f$ and that frequency distributions are indicated in FIGS. 4b and 4c. For convenience, here it is supposed that $F_1$ represents the length of the outer periphery of the 2-value patterns and $F_2$ the length of the periphery of holes. The explanation of the remaining $F_3$–$F_k$ is omitted. The ranking method for features will be explained, referring to this example. That is, in this example, patterns to be recognized as indicated in FIG. 4a (such as a circular part having a hole) are used, and although many features can be considered, only 2 of them, the length of the outer periphery and the length of the periphery of the hole, are indicated by $F_1$ and $F_2$, respectively.

FIG. 5a is a block diagram showing an outline of the ranking of features and the device therefor comprises the following parts: a classified category code set memory part 7 storing a set of mean values $\mu$ and standard deviations $\sigma$ concerning each feature for each of the categories, which are objects to be classified; a discrete distribution number calculation part 8 for the feature $F_1$ for calculating the discrete distribution number of the categories on the axis of the feature $F_1$ (similarly, the reference numerals 9-11 and the following denote discrete distribution number calculation parts concerning the axis of features $F_2$, $F_3$, $F_4$ and the following, respectively); a discrete distribution number comparison part 12 arranging the discrete distribution numbers on the axes of the features depending on their magnitude and outputting the name of the feature, i.e. a code, having the largest discrete distribution number; and a feature name memory part 13 storing the result of the ranking of features, i.e. the feature having the highest priority.

Next, the operation mode of each of the parts will be explained.

For the categories (in the initial state $C_a$-$C_f$) inscribed in the code set memory 7 of the categories which are to be classified, the discrete distribution number calculation parts 8-11 of the features $F_1$-$F_k$ calculate a discrete distribution number $N_D$ for each of the features, as indicated by Steps 111-115 of the flowchart indicated in FIG. 7a and output their value to the discrete distribution comparison part 12, as indicated by Step 116 of the flowchart. The calculation method for this value $N_D$ will be described later, referring to the flowchart as indicated in FIG. 7a. Then, the discrete distribution number comparison part 12 arranges the discrete distribution numbers thus outputted according to their magnitude and stores the feature having the largest discrete distribution number in the feature name memory part 13. The discrete distribution number means the number of combinations of 2 categories whose frequency distributions (probability density distributions) don't interfere with each other. The method for obtaining the discrete distribution number mentioned above will be explained, referring to FIG. 6. Each of the discrete distribution number calculation parts 8, 9, 10, 11, . . . comprises the following sections; a feature distribution data input section 14 receiving feature distribution data (the mean value and the standard deviation of the features for each of the categories) from the category code set memory part 7; a category combination control section 15 generating combinations of 2 categories among the inputted categories ($C_a$-$C_f$) in such a manner that they do not overlap each other and outputting distribution data for each of the 2 categories; an interdistribution distance calculation section 16 calculating the interdistribution distance between the 2 categories by using Eq. (4) stated later in Step 113 in the flowchart indicated in FIG. 7a, based on the distribution data of the 2 categories outputted by the category combination control section 15; an appearance region parameter memory section 17 storing parameters used for obtaining the interdistribution distance; a discreteness judgment section 18 judging whether the 2 categories are discrete or not, depending on the magnitude of the calculation result of the interdistribution distance calculation section 16; a discreteness judgment parameter memory section 19 storing the threshold value $D_w$, which is used by the discreteness judgment section 18 for the discreteness judgment; and a discrete distribution number counter 20 counting successively the number of times that the discreteness judgment section judges that the 2 categories are discrete.

Next the operation mode of these sections is explained according to the order of the internal operation in the discrete distribution number calculation part 9 for the feature $F_2$.

Corresponding to feature distribution data 14 in the compressed form of the mean value and the standard deviation for each of the categories, the category combination control section 15 generates combinations of 2 categories among the inputted categories $C_a$-$C_f$ in such a manner that they are not overlapped each other (e.g. $C_f$ and $C_c$ in FIG. 4c) and transmits distribution data (mean value and standard deviation) of the 2 categories to the interdistribution distance calculation section 16. The discrete distribution number $N_D$ is initialized, i.e. it is set to zero in advance. Thereafter, every time the discreteness judgment section gives a start command 21, the combination control section 15 repeats the procedure described above in Step 112 in the flowchart indicated in FIG. 7a, until all the combinations of the categories are outputted.

The interdistribution distance calculation section 16 calculates the interdistribution distance DD represented by the following equation by using the mean value and the standard deviation of the 2 categories transmitted by the combination control section in Step 113 in the flowchart indicated in FIG. 7a.

$$DD = \frac{\theta_{k,1} - \theta_{l,2}}{\max\{\theta_{k,2}, \theta_{l,2}\} - \min\{\theta_{k,1}, \theta_{l,1}\}} \qquad (4)$$

where $\theta_{k,1\ or\ 2}$: lower or upper limit of the appearance region of the category whose mean value is larger between the 2 categories (e.g. $\theta_{c1}$, $\theta_{c2}$ in FIG. 4c for $C_c$)

$\theta_{l,1\ or\ 2}$: lower or upper limit of the appearance region of the category whose mean value is smaller between the 2 categories (e.g. $\theta_{f1}$, $\theta_{f2}$ in FIG. 4c for $C_f$)

In addition, the lower, upper limit $\theta_{i1,2}$ of the appearance region of each of the categories is represented by Eq. (5).

$$\theta_{i1,2} = (\text{mean value}) \pm \alpha \times (\text{standard deviation}) \qquad (5)$$

where $\alpha$ is supplied by the appearance region parameter memory section 17. In general, when a feature has a normal distribution, if $\alpha=3$, an appearance region covering 99.7% of a category is expressed.

Then, in the discreteness judgment section 18, in Step 114 indicated in FIG. 7a, in the case where the interdistribution distance outputted by the interdistribution distance calculation section 16 is greater than the threshold value $D_w$ supplied by the discreteness judgment parameter memory section 19, the 2 categories are regarded as discrete, and in Step in the flowchart indicated in FIG. 7a, 1 is added to the content of the discrete distribution number counter. Then the category combination control section 15 is restarted and the similar procedure is effected for the categories of the following combination by repeating Steps 113-115 in the flowchart. On the other hand, in the case where the interdistribution distance is smaller than the threshold $D_w$, the 2 categories are regarded as not discrete, i.e. in the case where the output of Step 114 in the flowchart is "NO", the classification is considered as impossible. In this case, there is no count and the category combination control section 15 is started to effect the similar procedure for the following combination of categories. For the 2 examples shown in FIGS. 4b and 4c, if $\alpha=3$, $D_w=0$, the combinations of discrete categories are, for $F_1$, $(C_a, C_d)$, $(C_a, C_e)$, $(C_a, C_f)$, $(C_b, C_d)$, $(C_b, C_e)$, $(C_b, C_f)$, $(C_c, C_d)$, $(C_c, C_e)$ and $(C_c, C_f)$, and thus the discrete distribution number is 9. In the same way, for $F_2$ it is 12. Consequently, in the ranking in the feature name memory part 13 $F_2$ has a higher priority than $F_1$. That is, it can be concluded from the output of this system according to this embodiment that it is better to use the feature $F_2$ in FIG. 4c than the feature $F_1$ in FIG. 4b.

In this example the discreteness judgment between 2 categories, which is necessary for obtaining the interdistribution number, has been effected by using the interdistribution distance described above. Thereby the following effects can be obtained.

(1) The interdistribution distance can be obtained by a very simple calculation, based on the mean value and the standard deviation of the 2 categories and the appearance region parameter $\alpha$.

(2) It is possible to realize a flexible system, because the risk of the classification can be easily regulated, depending on the purpose, by varying suitably the appearance region parameter $\alpha$ defining the extent of the appearance region and the discreteness judgment parameter $D_w$ used as the threshold value for the discreteness judgment.

For example, in the case where all the parts belonging to a category are identical such as industrial parts, data sampled several times have almost always a normal distribution, because fluctuations of calculated values of a feature are provoked only by accidental errors due to unevenness of illumination or lens. Consequently, for such a case, it can be supposed that $\alpha=3$, $D_w=0$. (This is true only by the case where a risk of 0.3% is allowed.) On the other hand, in the case where variations in size are large, e.g. in an assortment of fruits, fishes, etc., sampled data don't have always a normal distribution and deformed examples are not contained sufficiently. In this case it is preferable to use sufficient large $\alpha$ and $D_w$. (e.g. $\alpha=4$, $D_w=0.3$, etc.) In general, preferable ranges of $\alpha$ and $D_w$ are:

$$2 \leq \alpha \leq 5$$

$$-0.5 \leq D_w \leq 0.5$$

In the embodiment described above a method for the ranking for obtaining a feature, which is effective for the recognition where there are several objects to be recognized at the time of classification as indicated in FIGS. 4a-4c and which is the inputted pattern among the objects to be recognized should be outputted, has been explained. However, by changing several operation modes of the category combination control section 15, as explained hereinbelow, it is possible to realize a ranking of features, which is effective to distinguish a plurality of defective quality categories from one good quality category such as for a defection control.

Figure 1B:
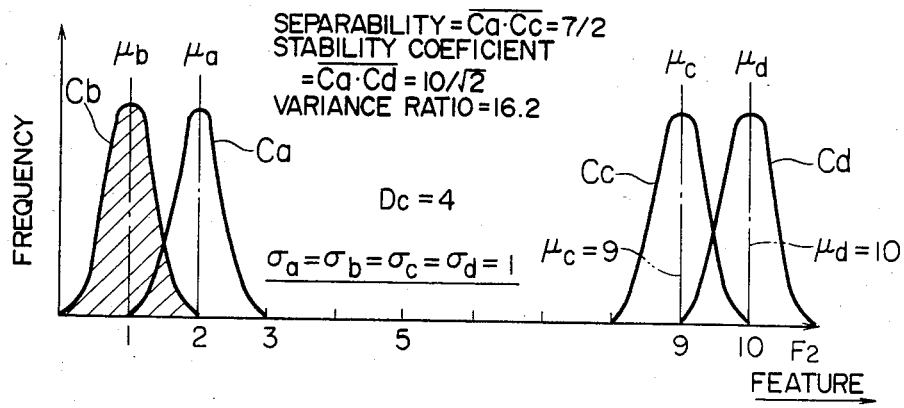
Figure 1C:
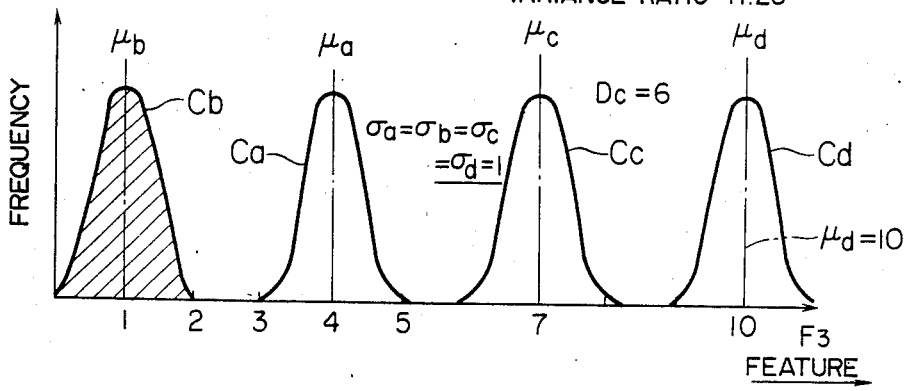

Suppose now that the category $C_b$ hatched in FIGS. 1a-1c represents the good quality category and the others are defective quality ones. For example, take a tablet control as an example and suppose that $C_a$ represents a broken tablet; $C_c$ a tablet on which one or more small particles are attached; $C_d$ two tablets stick together $F_1$ indicates the area; $F_2$ the length of the periphery; and $F_3$ the form factor (periphery length$^2$/area). In this case there are only 2 types of outputs, i.e. good quality and defective quality. Consequently a feature permitting distinguishment of the good quality category $C_b$ from the other defective quality categories $C_a$, $C_c$ and $C_d$ is sufficient. That is, the greater the number of discrete categories with respect to the good quality category ($C_b$) there are, the better the feature is. Consequently, by modifying the operation mode of the category combination control section so that it generates successively combinations of the good quality category ($C_b$) and the other defective quality categories ($C_a$, $C_c$ and $C_d$) and outputs distribution data of the 2 sorts of the categories, it is possible to realize easily the ranking of features for this case. For example, the discrete distribution number for $F_1$ in FIG. 1a is 1, because there is only one category $C_d$ which can be classified by it with respect to the reference category $C_b$. It is 2 and 3 for $F_2$ in FIG. 1b and $F_3$ in FIG. 1c, respectively. Thus it can be concluded that $F_3$ is the most effective. According to this method, it is possible to provide easily a method for ranking features for the purpose of the preparation of a recognition dictionary in the defection control, where there are a plurality of sorts of categories with respect to only one good quality category. Moreover the outputted ranking of the features can decide suitably the merit of their performance.

By using the discrete distribution number as a measure for the evaluation of features, the number of steps necessary for obtaining one recognition result can be reduced with respect to that necessitated by using a judgment tree structure recognition dictionary according to the method for ranking features utilizing a prior art separability method, etc. and as a result the recognition time in an on-line recognition operation is considerably shortened. For example consider a case where the feature $F_1$-$F_3$ indicated in FIGS. 1a-1c are given for the preparation of a decision tree structure dictionary. According to the prior art method, since the separability, assigns the largest features to each of the nodes, more than 2 features should be used for obtaining one recognition output as indicated in FIGS. 2a and 2b. To the contrary, according to the discrete distribution number method of this invention, only one feature is used, as indicated in FIG. 2c. Since the calculation time for a feature is usually about 20 ms and thus very long with respect to the judgment time necessary for the classification, the recognition treatment time can be considered to be decided almost exclusively by the number of features. Consequently, by using the method according to this invention an on-line recognition can be outputted about in a half of the treatment time necessary by the prior art method.

Next the method for the category classification effected successively on the axis of each of features on the basis of the output of the ranking of features obtained at the feature name memory part 13 in FIG. 5a will be described by referring to FIGS. 5b, 6, 7a, 7b and 8.

Suppose now that the categories $C_a$-$C_f$ are distributed on the feature X axis, as indicated in FIG. 8. Two categories, whose frequency distributions or probability density distributions don't interfere with each other, i.e. which are discrete categories to each other, and whose distrubutions reach each other most frequently, i.e.

which are mutually adjacent discrete, are classified by setting a threshold value therebetween. For example, among the discrete categories $C_c$, $C_d$, $C_e$ and $C_f$ with respect to the category $C_a$, there is no nearest category at the left side (zero) and the category $C_c$ is selected as the nearest at the right side. In this way the discrete categories for each of the categories ar obtained as indicated in the rectangles 31-36 indicated in FIG. 8. Among these the combinations of the categories, which are mutually adjacent and discrete, are only $C_c$ and $C_a$, $C_b$ and $C_d$, $C_e$ and $C_f$. For example, since $C_c$ and $C_d$, $C_d$ and $C_f$ are not mutually adjacent, they don't fulfil the requirement. The meaning of "not to interfere" can be understood by the expression at the threshold value Th on the x axis $$\int_{-\infty}^{Th} e_2(x)dx + \int_{Th}^{\infty} e_1(x)dx \leq \text{const.},$$

$e_1(x)$ and $e_2(x)$ being 2 error functions.

The method, by which all the combinations of the mutually adjacent discrete categories are obtained and the category classification is effected by setting a threshold between 2 categories belonging to a combination, will be described below.

Figure 5B:
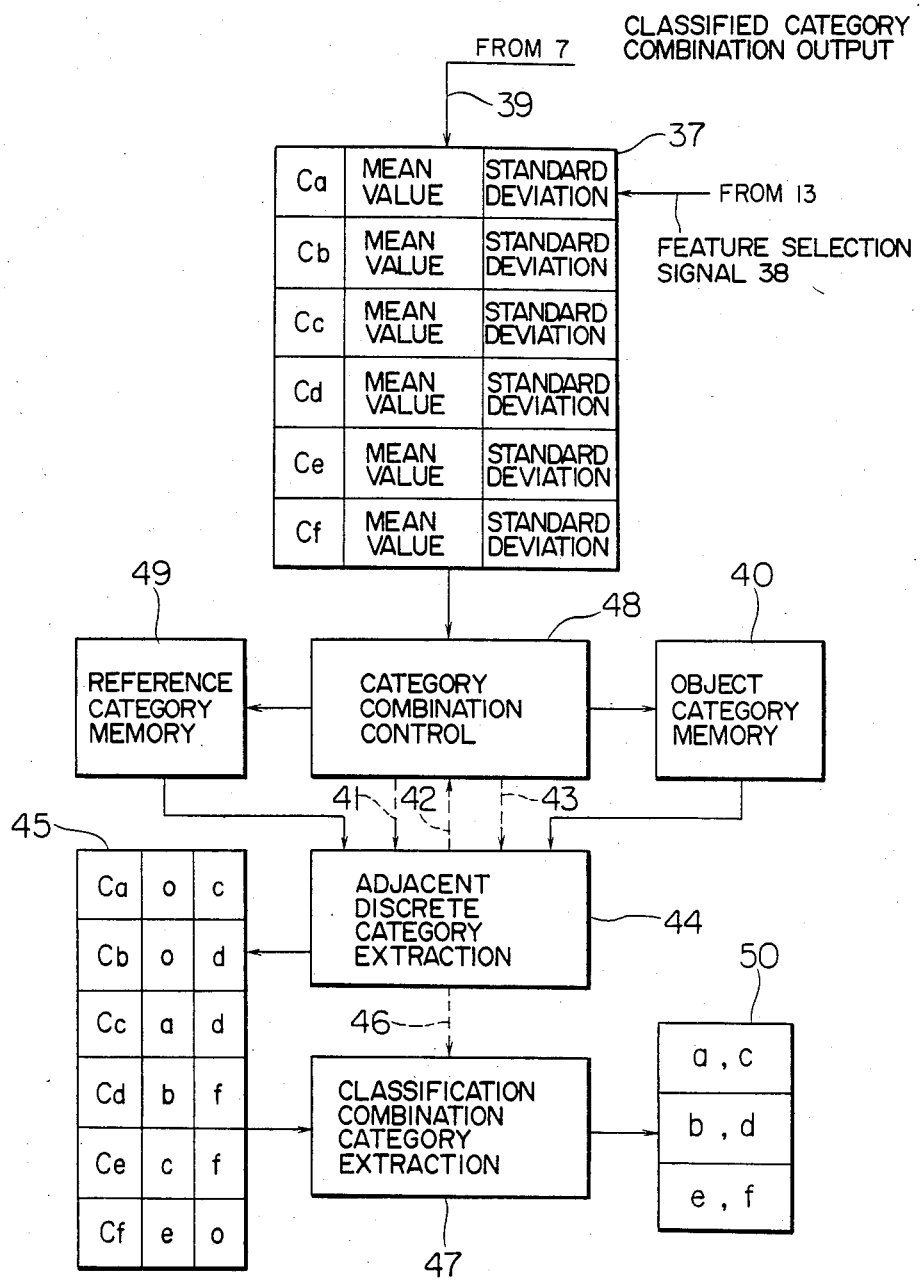
Figure 6:
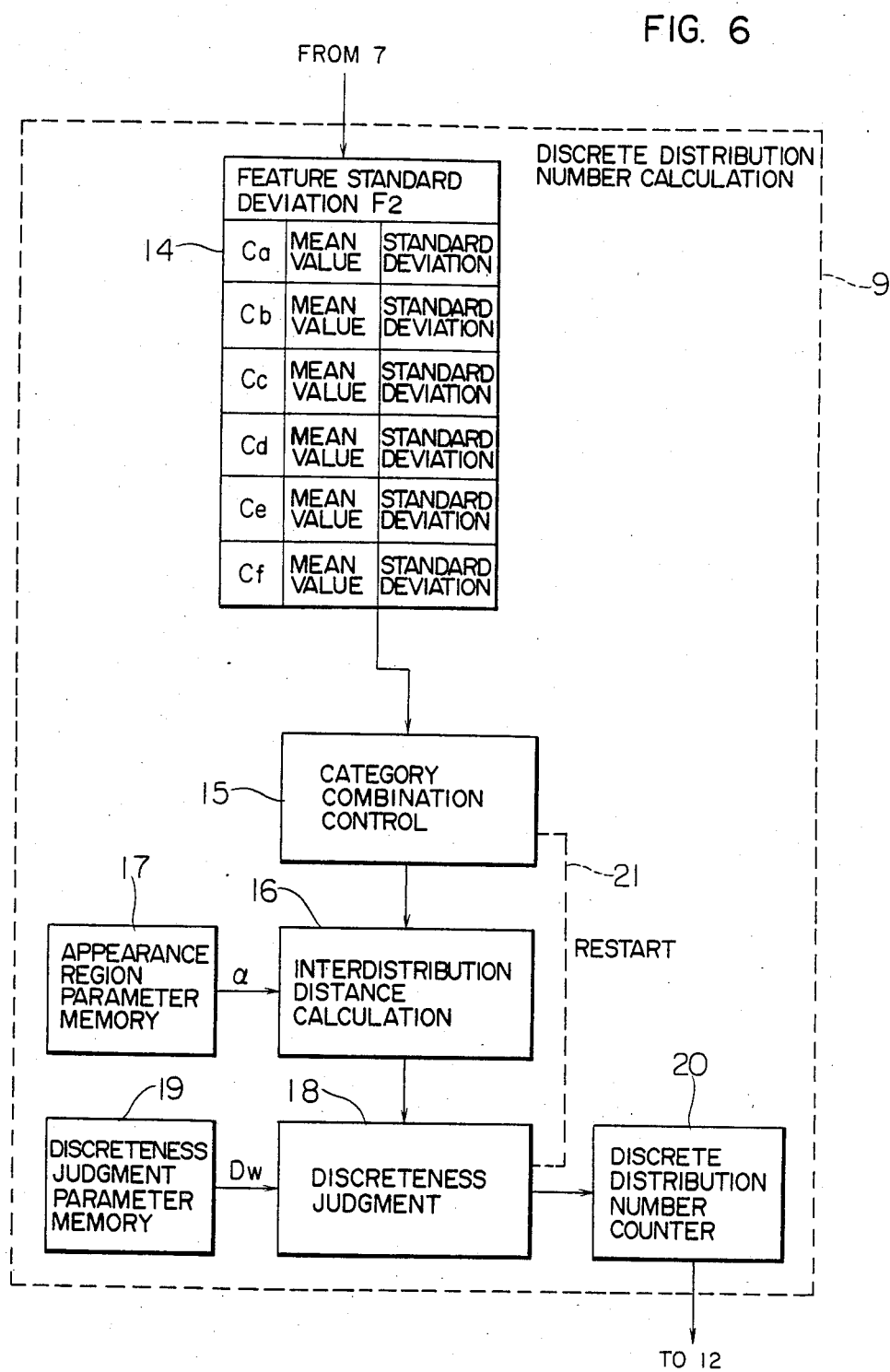
FIG. 6 is a block diagram representing a calculation of the discrete distribution number in an embodiment according to this invention.

Referring to FIG. 5b, distribution data ($F_4$) concerning a feature (121 in FIG. 7b) selected from the category set memory 7, based on a feature selection signal 38 from a feature ranking output memory part 13 are inputted through a line 39 and a distribution data input part 37 to the category combination control part 48.

At first the category combination control section 48 adopts the first category (e.g. $C_a$) among those inputted in each of the distrubution data input parts 37 as the reference category and stores the mean value and the standard deviation of the category in the reference category memory section 49. Then, in order to judge whether a category (e.g. $C_f$) is adjacent and discrete with respect to the reference category or not, the mean value and the standard deviation of the category of the object to be judged are stored through an input part 37 in an object category memory section 40 and an object category renewal signal 41 is transmitted to an adjacent discrete category extraction section 44. The extraction section 44 extracts adjacent discrete categories and sends them to an adjacent discrete category code memory section 45. Thereafter the category combination control section 48 updates the object category by a start signal 42 coming from the adjacent discrete category extraction section 44 ($C_b \rightarrow C_c \rightarrow C_d \rightarrow C_e \rightarrow C_f$) and sends object category renewal signals 41 one after another.

The category combination control section 48 returns the object category to the first category ($C_a$) after having updated the last object category ($C_f$) and at the same time renews the reference category ($C_a \rightarrow C_b$). In addition, at this moment, it sends a reference category renewal signal 43 to the adjacent discrete category extraction section 44.

The adjacent discrete category extraction section 44 analyzes the relation between the category distribution in the reference category memory section 49 and the category distribution in the object category memory section 40, as explained later, by a renewal signal 41 sent by the category combination control section 48. Thereafter it sends a start signal 42 to the category combination control section 48 and makes it update the object category. The adjacent discrete category extraction section 44 repeats the procedure described above, and extracts 2 adjacent discrete categories with respect to the current reference category among the object categories by the analysis explained later, until the category combination control section 48 updates the reference category, and stores their category code in the discrete category code memory section 45. In FIG. 5b, 0 means that there is no adjacent discrete category. Usually each of the categories has two adjacent discrete categories, one at the left side and the other at the right side, but the categories $C_a$, $C_b$ and $C_f$ in FIG. 8 have only one respectively. The adjacent discrete category extraction section 44 sends a start signal 46 to a classification combination category extraction section 47 after having extracted adjacent discrete categories for each of all the categories ($C_a-C_f$) and terminates its operation. The classification combination category extraction section 47 extracts the combinations of the categories, which are adjacent distrete to each other, among the combinations of each of the reference categories stored in the adjacent discrete category memory section 45 and the adjacent discrete categories with respect to the reference category, as explained later, and stores them in a classification combination category code memory section 50.

Figure 9:
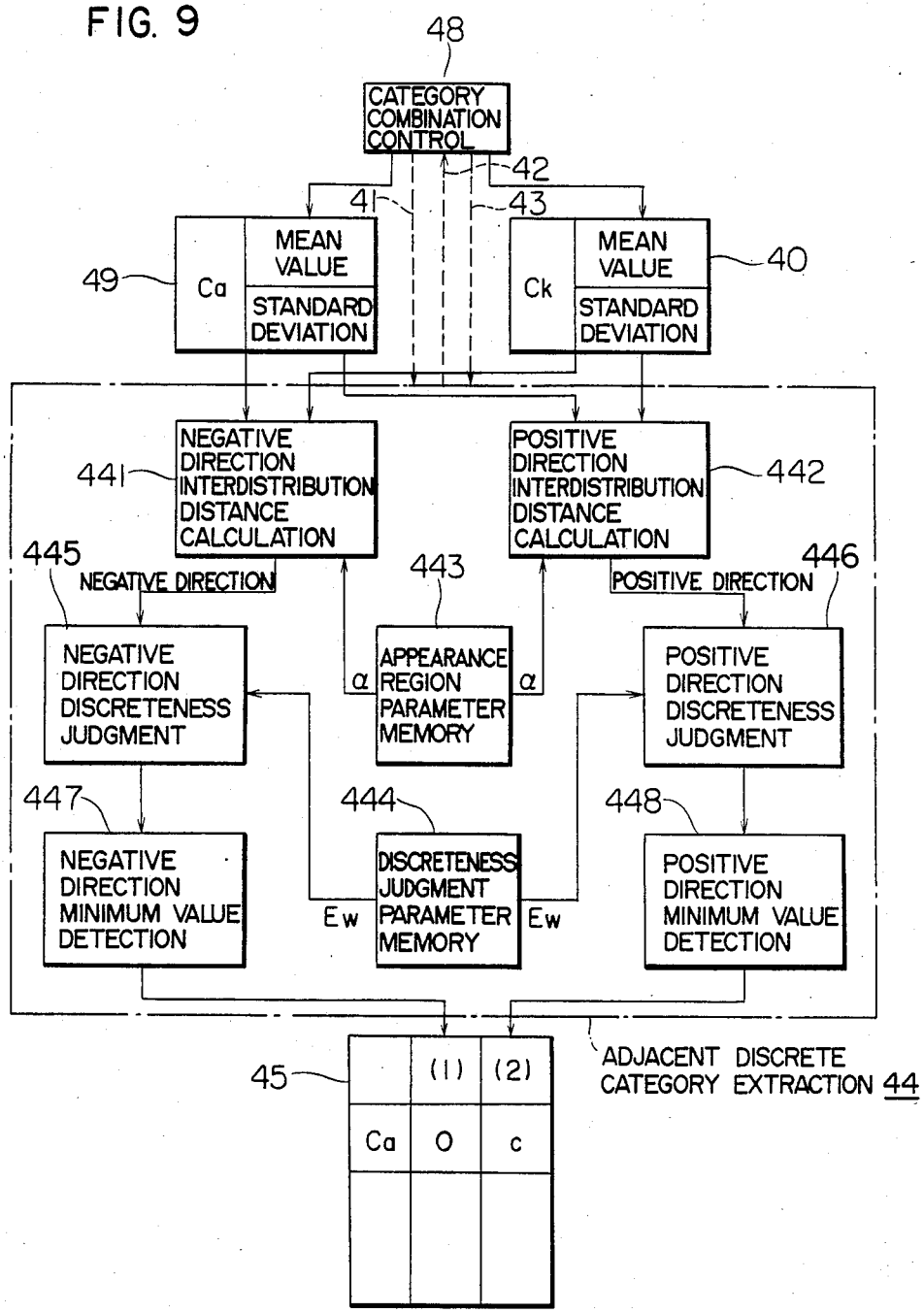
FIG. 9 is a scheme for explaining an adjacent discrete category extraction part in detail.

Next the details of the adjacent discrete category extraction section 44 will be explained, referring to FIG. 9. The adjacent discrete category extraction section 44 consists of the following parts: a negative direction interdistribution distance calculation part 441 obtaining an interdistribution distance in the negative direction of the object category from the reference category by using data stored in the reference category memory section 49 and those stored in the object category memory section 40; a positive direction interdistribution distance calculation part 442 obtaining an interdistribution distance in the positive direction of the object category from the reference category in the same manner; an appearance region parameter memory part 443 storing parameters used for obtaining the interdistribution distance between 2 categories; a negative direction discreteness judgment part 445 comparing the negative direction interdistribution distance of the object category outputted by the negative direction interdistribution distance calculation part 441 with the threshold value $E_w$ previously stored in the discreteness judgment parameter memory part 444, judging whether the object category is discrete in the negative direction with respect to the reference category or not, and transforming the interdistribution distance into a suitable value; a positive direction discretness judgment part 446, in the same way, comparing the positive direction interdistribution distance of the object category outputted by the positive direction interdistribution distance calculation part 442 with the threshold value $E_w$ previously stored in the discreteness judgment parameter memory part 444, judging whether the object category is discrete in the positive direction with respect to the reference category or not, and transforming the interdistribution distance into a suitable value; the discreteness judgment parameter memory part 444 memoryizing the threshold value $E_w$ used for the discreteness judgment described above; a negative direction minimum value detection part 447 registering category codes of the categories indicating the minimum value of the interdistribution distance outputted by the negative direction discreteness judgment part 445 from the initial state of the adjacent discrete category extraction section 44 to the present time, i.e. the discrete categories which are nearest to the current reference category one after another in accordance with the address of the current reference category in the adjacent discrete category code memory section 45; and a positive direction minimum value detection part 448, in the same way, registering category codes of the categories indicating the minimum value of the interdistribution distance outputted by the positive direction discreteness judgment part 446 one after another in accordance with the address of the current reference category in the adjacent discrete category code memory section 45.

The threshold value $E_w$ can be the same as the threshold value $D_w$ mentioned previously, but here they are differently indicated.

In the following, the operation mode of the adjacent discrete category extraction section 44 will be explained.

When a renewal signal 41 of the category combination control section 48 is detected, the negative and positive direction interdistribution distance calculation sections 441 and 442 calculate the negative and positive interdistribution distance of the object category with respect to the reference category, respectively (in Step 122 in FIG. 7b). Here the negative and positive direction interdistribution distances BD(−) and BD(+), respectively, are defined by the following equations;

(i) negative direction interdistribution distance BD(1):

$$BD(-) = \frac{\theta_{K,1} - \theta_{k,2}}{\max\{\theta_{K,2}, \theta_{k,2}\} - \min\{\theta_{K,1}, \theta_{k,1}\}} \quad (6)$$

(ii) positive direction interdistribution distance BD(+):

$$BD(+) = \frac{\theta_{k,1} - \theta_{K,2}}{\max\{\theta_{K,2}, \theta_{k,2}\} - \min\{\theta_{K,1}, \theta_{k-1}\}}, \quad (7)$$

where $\theta_{K,1}$, $\theta_{K,2}$: lower and upper limit of the appearance region of the reference categroy, $\theta_{k,1}$, $\theta_{k,2}$: lower and upper limit of the appearance region of the object category.

In addition, the upper and lower limits $\theta_1$, $\theta_2$ of the appearance region of a certain category are defined by the following formula.

$$\left.\begin{array}{c}\theta_1 \\ \theta_2\end{array}\right\} = \text{(mean value)} \mp \alpha \times \text{(standard deviation)} \quad (8)$$

Figure 10:
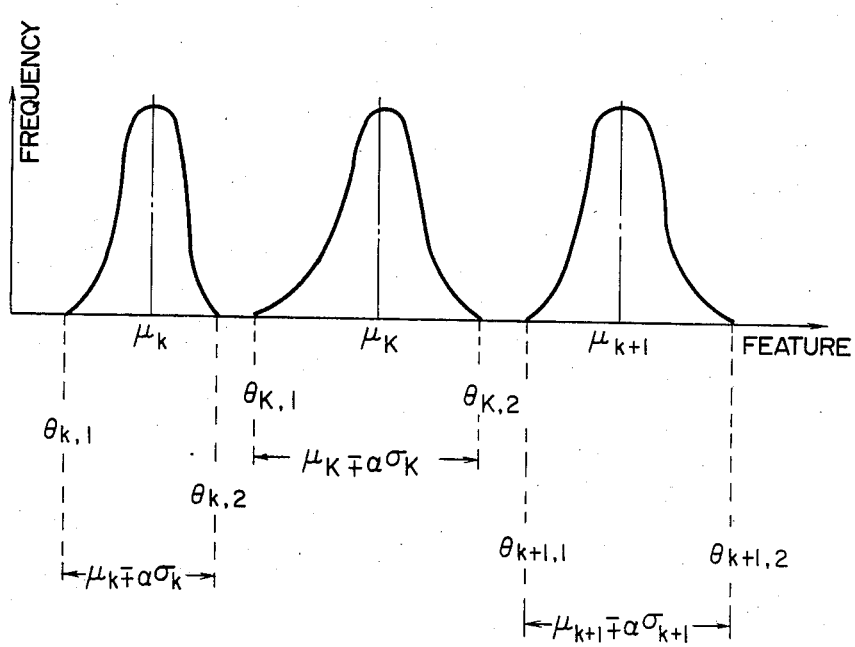
FIG. 10 is a scheme for explaining a formula for calculating th distribution distance.

FIG. 10 indicates the relation among these values. The figure illustrates the reference category having a suffix K and 2 object categories having a suffix k and k+1, respectively, as an example. Eq. (6) is explained below, referring to FIG. 10. The numerator is the difference between $\mu_K - \alpha\sigma_K$ of the reference category, whose mean value is $\mu_K$, i.e. $\theta_{K,1}$ and $\mu_k + \alpha\sigma_k$ of the caterogy, whose mean value is $\mu_k$, i.e. $\theta_{k,2}$. The denominator is, in this example, the difference between $\theta_{K,2}$ and $\theta_{k,1}$. BD(−) can be calculated by using Eq. (6).

Here $\alpha$ is supplied by the appearance region parameter memory part 443.

Next the negative and positive direction discreteness judgment parts 445 and 446 compare the interdistribution distances outputted by the negative and positive direction interdistribution distance calculation parts 441 and 442, respectively, with the threshold value $E_w$ stored in the discreteness judgment parameter memory part 444 (123 in FIG. 7b) and transform the interdistribution distance as follows.

If the interdistribution distance is BD and the threshold value is $E_w$.

$$BD > E_w \rightarrow BD = BD \text{ (unchanged)} \quad (9)$$

$$BD \leq E_w \rightarrow BD = 2 \text{ (transformed)} \quad (10)$$

That is, in the case where the negative (positive, hereinbelow the description for the positive direction is shown in parentheses so that the explanation is valid for both the directions) direction interdistribution distance $BD > E_w$, the object category is regarded as discrete in the negative (positive) direction (124 in FIG. 7b). Next, in order to detect a category which is discrete and the nearest, i.e. an adjacent discrete category, the interdistribution distance is outputted, as it is, in the negative direction minimum value detection part 447 (the positive direction minimum value detection part (448). To the contrary, if $BD \leq E_w$, the object category is regarded as not discrete in the negative (positive) direction and the interdistribution distance is outputted after have been transformed into such a value that it is never detected as the smallest value in the following negative direction minimum value detection part 447 (the positive direction minimum value detection part 448). (Since the interdistribution distance is always smaller than 1, e.g. if BD=2 or BD=3, it cannot be the smallest value.) That is, since $BD \leq 1.0$, it is sufficient that the value of transformed $BD > 1.0$. Moreover since $BD \leq E_w$ means that the interdistribution distance is smaller than the threshold value $E_w$, it can never be judged as a discrete category.

Next the negative direction minimum value detection part 447 (the positive direction minimum value detection part 448) compares the minimum value among the interdistribution distances detected from the initial state to the present time (the distance is set at 2 in the initial state) with the interdistribution distance outputted by the negative direction discreteness judgment part 445 (the positive direction discreteness judgment part 446). If the interdistribution distance outputted at that time is smaller, it adopts that distance as a new minimum value and at the sametime makes the adjacent discrete category memory section 45 memorize the category code of the current 2 object categories as the adjacent discrete categories with respect t the reference category. In the case where $C_a$ in FIG. 8 is the reference category, the adjacent discrete category in the positive direction is $C_c$ and there is no adjacent discrete category in the negative direction. For the latter case 0 is stored. When the operations described above terminates, the adjacent discrete category extraction section 44 transmits a renewal signal 42 to the category combination control section 48 and the same procedure is repeated for the following object categories $C_d$–$C_f$. Further, when a reference category renewal signal 43 from the category combination control section 48 is detected, the whole system is reset to the initial state and after having changed the reference category to $C_b$, the same procedure is repeated. When the adjacent discrete categories are obtained for all the reference categories in the manner described above, a start signal 46 is sent to the classification combination category extraction section 47 in FIG. 5b and the operation is terminated.

Figure 11:
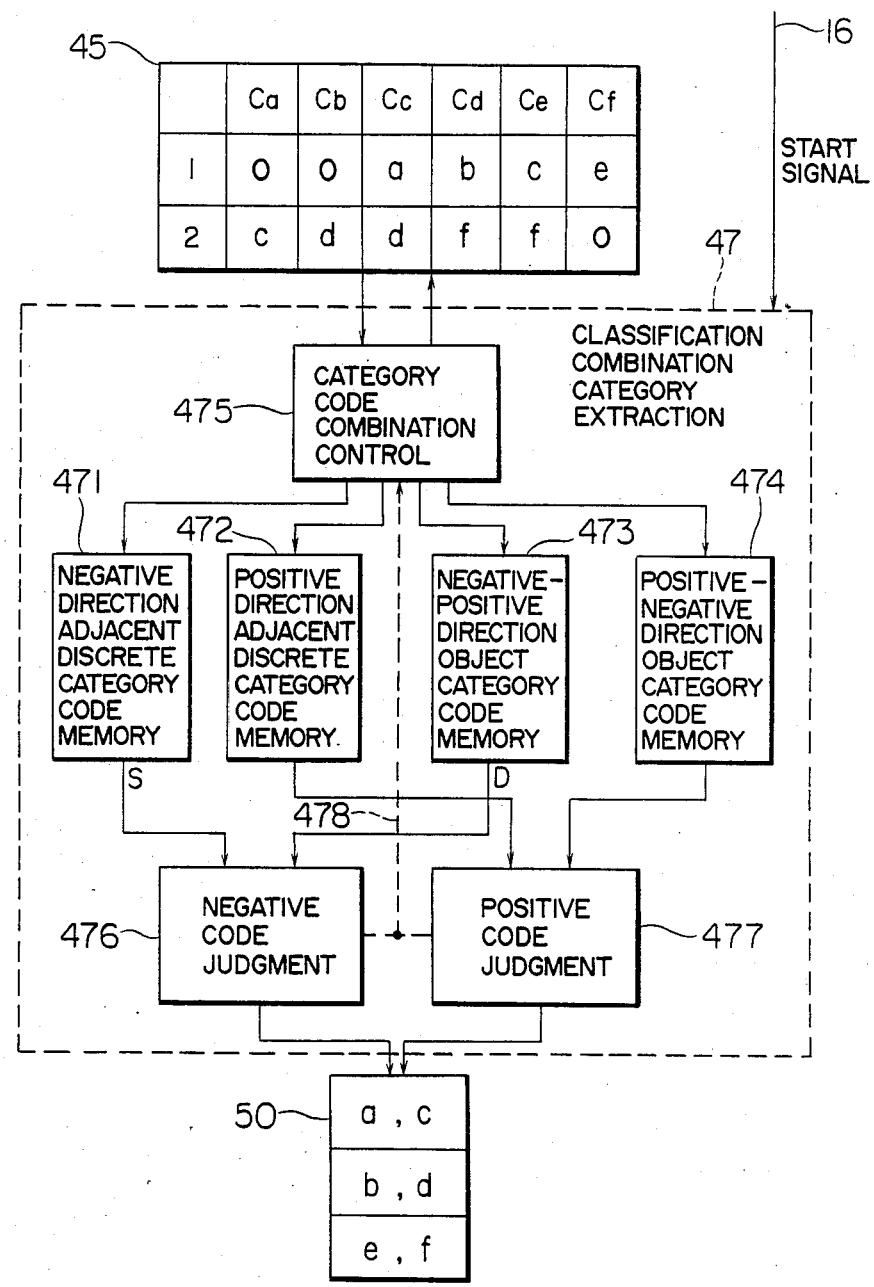
FIG. 11 is a scheme for explaining a classification combination category extraction part in detail.

In the following the details of the classification combination category extraction section 47 will be explained, referring to FIG. 11. The classification combination category extraction section 47 consists of the following parts: a negative direction adjacent discrete category code memory part 471 storing the code of the category which is adjacent discrete with respect to a certain reference category; a positive direction adjacent discrete category code memory part 472 storing the code of the category which is adjacent discrete with respect to the reference category; a negative-positive direction object category code memory part 473 storing the code of the category which is adjacent discrete in positive direction with respect to the negative direction adjacent discrete category with respect to the reference category; a positive-negative direction object category code memory part 474 storing the code of the category which is adjacent and discrete in negative direction with respect to the positive direction adjacent discrete category with respect to the reference category; a category code combination control part 475 controlling the category code memorizing in these 4 category code memory parts; a negative code judgment part 476 extracting a category which is adjacent discrete in the negative direction with respect to the reference category and at the same time mutually adjacent discrete with respect to said reference category and storing the combination of said category and the reference category in a classification combination category memory part 50; and a positive code judgment part 477 extracting a category which is adjacent discrete in the positive direction with respect to the reference category and at the same time mutually adjacent discrete with respect to said reference category (Step 125 in FIG. 7b) and storing the combination of said category and the reference category in the classification combination category memory section 50. Next the operation mode of each of the parts will be explained.

When a start signal 16 outputted by the adjacent discrete category extraction section 44 is detected, the category code combination control part 475 stores the code (0: Code meaning absence) of the code ($C_0$; meaning absence) which is adjacent discrete in the negative direction with respect to the reference category ($C_a$), which has been stored at the first time in the adjacent discrete category code memory section 45, and the code (C) of the positive direction adjacent discrete category ($C_e$) in the code memory part 471 and in the code memory part 472, respectively, and at the same time stores the code (0) of the category which is adjacent discrete in the positive direction with respect to said negative direction adjacent discrete category and the code (a) of the category ($C_a$) which is adjacent discrete in the negative direction with respect to the positive direction adjacent discrete category ($C_c$) with respect to the reference category ($C_a$) in the code memory part 473 and in the code memory part 474, respectively. Then the category code combination control part 475 clears (sets at 0) all the adjacent discrete category codes with respect to the reference category ($C_a$) handled at that time in the adjacent discrete category memory section 45. Thereafter, every time the category code combination control part 475 detects a start signal from the negative and positive code judgment parts 476 and 477, it renews the reference category ($C_a \rightarrow C_b$) and the same procedure is repeated. When the last reference category ($C_f$) stored in the adjacent discrete category code memory section 45 is renewed, a series of the operations are terminated. The above sequence having double operation of searching an adjacent discrete category is very effective in the following example. If an adjacent discrete category to the reference category $C_d$ of FIG. 8 is searched in the positive direction, the $C_f$ is found. However, when an adjacent discrete category to the reference category $C_f$ is searched in the negative direction, the $C_e$ which is other than the $C_f$ will be found. In this case, the categories $C_d$ and $C_f$ do not satisfy the mutually adjacent discrete relation. In FIG. 8 as will be seen, the right hand column of the block 34 is not equal to the left hand column of the block 36. When determined codes are started in the various sorts of code memory parts (471–474), the negative direction code judgment part 476 compares the content of the code memory part 471 with the content of the negative-positive object category code memory part 473; judges whether the current reference category ($C_a$) and the category ($C_0$) which is adjacent discrete in the negative direction with respect to said current reference category are mutually adjacent discrete or not; stores the data in the classification combination category code memory section 50, if they are mutually adjacent discrete; and outputs a start signal 478. (In the case where they are not mutually adjacent discrete, it simply outputs a start signal.) Here suppose that the content of the code memory part 471 is S and the content of the code memory part 473 is D. Then, if S=D and S≠0 and D≠0, the current reference category and the category which is adjacent discrete in the negative direction with respect to said reference category are regarded to be mutually adjacent discrete. In the same way, the positive direction code judgment part 477 compares the content of the code memory part 472 with the content of the code memory part 474; judges whether the current reference category ($C_a$) and the category ($C_c$) which is adjacent discrete in the positive direction with respect to said current reference category ar mutually adjacent discrete or not; stores the data in the classification combination category code memory section 50, if they are mutually adjacent discrete; and outputs a start signal 478. (In the case where they are not mutually adjacent discrete, it simply outputs a start signal.) Here suppose that the content of the code memory part 471 is S and the content of the code memory part 432 is D. Then, if S=D and S≠0 and D≠0. The current reference category and the category which is adjacent discrete in the positive direction with respect to said reference category are regarded to be mutually adjacent discrete.

By applying this method described above to the example of FIG. 8, $\{C_e, C_a\}$, $\{C_b, C_d\}$ and $\{C_e, C_f\}$ can be obtained as classification combination categories. For the classification into small groups threshold values $T_1-T_3$ are set between two of said classification combination categories (e.g. at interior dividing points based on the standard deviation of the two categories) and the categories existing between a certain threshold value and another threshold value can be easily obtained as categories, either the upper limit or the lower limit of the appearance region of which is at one of the threshold values stated above: (For example the categories existing between $T_1$ and $T_2$ are $C_b$ and $C_e$.)

By this method, in the preparation operation of a tree structure recognition dictionary, the category division for a certain object element group at a node of the tree structure has been effected by using the most suitable feature.

Further category division, i.e. classification, can be effected by using a feature which is the most suitable for a certain subgroup in a classification at a mode of lower rank.

In this embodiment, the discreteness judgment between categories necessary for obtaining combinations of categories which are mutually adjacent has been effected by using the interdistribution distance stated above. In this way the following effects can be obtained.

(1) Since the interdistribution distance can be obtained by an extremely simple calculation using the mean value and the standard deviation two categories and an appearance region parameter $\alpha$, discreteness judgment can be effected very easily.

(2) Since the risk taken by the classification is regulated depending on the purpose, by varying conveniently the appearance region paramenter $\alpha$ which defines the extent of the appearance region of a category and the discreteness judgment parameter $E_w$ used as the threshold value for the discreteness judgment, it is possible to realize an extremely flexible recognition system.

For example, in the case where all the parts belonging to a category are identical such as industrial parts, data sampled several times almost have always a normal distribution, because fluctuations of calculated values of a feature are provoked only by accidental errors due to unevenness of illumination or lens. Consequently, in such a case, adopting $\alpha=3$, $E_w=0$, the misclassification rate is less than 0.3%, and thus there are no problems in practice. However, in the case where variations in size are large, e.g. in the assortment of fruits, fishes, etc., sampled data don't always have a normal distribution and deformed examples are not contained sufficiently. In this case it is preferable to use still larger $\alpha$ and $E_w$. (e.g. $\alpha=4$, $E_w=0.3$, etc.)

At the time of a category classification, when a decision tree structure recognition dictionary is prepared by using a method by which threshold values are set between two of all the categories, which are mutually adjacent discrete, it is possible to reduce considerably the number of steps of features used until a recognition result is obtained with respect to those necessitated by using a prior art decision tree structure dictionary and as a result to shorten remarkably the recognition time.

The object of the category classification is not limited to the outer form of bodies. Character recognition is also possible by means of a tree structure prepared by selecting features, which are effective for distinguishing each character, when light and darkness information of each of the characters including alphanumeric symbols is inputted.

Furthermore the object of the classification is not limited to pattern recognition data. In other words, if any data or information of objects to be classified and having measurable features were provided, the most suitable one of the features can be selected using the data or information according to the invention.

Figures 12A, 12B:
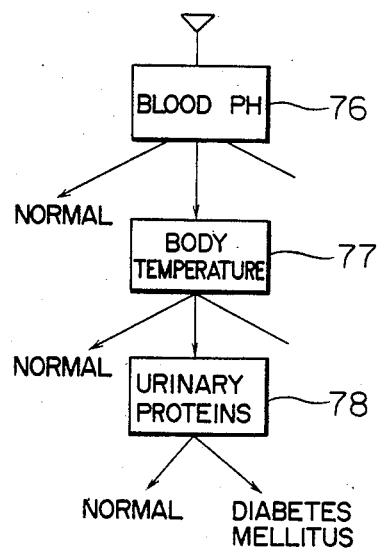
FIGS. 12a and 12b are schemes for explaining the effect of this invention.

Accordingly this invention does not necessarilly include a pattern information step or means. Referring to FIG. 12a, each of features, such as blood pressure 73, number of pulse 74, blood PH 75, urinary proteins, body temperature, has a mean value and a standard deviation depending on the disease of the patient, such as bacillary dysentery, influenza, etc. Suppose now to be at a node of a tree structure to identify the disease from which the patient suffers. By the method described in the embodiment explained by referring to FIG. 5a, whether a category "INFLUENZA" 71 and a category "BACILLARY DYSENTERY" 72 are mutually discrete or not is judged, basing on obtained data, i.e. the mean value and the standard deviation, for the feature "BLOOD PRESSURE" for each disease, and a discrete distribution number is calculated. Categories for every disease are classified by using the feature giving the largest discrete distribution number. It is possible to provide a medical analyzing device permitting rapid judgments for a number of diseases in this manner in a tree structure indicated in FIG. 12b by using a feature having a high priority, e.g. BLOOD PH 76.

In the following the effects of this invention will be explained concretely, referring to FIGS. 13a-13c. Suppose now that there is a group 80 consisting of categories, which are objects to be recognized, $C_1$-$C_N$ (in total N categories, N being an even number). According to the prior art method the group is classified into 2 categories $C_{N/2}$ and $C_{N/2+1}$ having the largest distance among the combinations of adjacent categories on the axis of a given feature ($F_1$) 81, as indicated in FIG. 13a. In this case, it is supposed that the categories to be handled are classified always evenly into 2 for simplicity $$\{C_{\frac{N}{2}+1}, \ldots C_N\} \rightarrow \{C_{\frac{N}{2}+1} \text{ to } C_{\frac{3}{4}N}, C_{\frac{3}{4}N+1} \text{ to } C_N\}.$$

To the contrary, according to this invention, as indicated in FIG. 13b, it is supposed that the group is classified always evenly into k on the axis of a given feature and that, in addition, since features given to a node is proper to the category to be classified, all features given to each node are different. When the number of steps of features used until a recognition result is outputted under the conditions described above is obtained for the tree structures indicated in FIGS. 13a and 13b, the result shown in FIG. 13c is obtained (the number of categories is 30). The number of steps of features until a recognition result is outputted is, according to the prior art method, equal to the value indicated by a circle 89, i.e. $\log_2 30 \approx 5$. To the contrary, according to this invention, it can be represented by $\log_k 30$, and thus at the worst case (k=2) it is equal to that necessitated by the prior art method. It can be understood that for the other cases (k≧3) the recognition result is outputted by an extremely small number of steps of features. Consequently the recognition time can be remarkably shortened by the method according to this invention with respect to that necessary for the prior art method, because the recognition processing time is determined by the number of steps of features. (The number of steps of features used here means the number of nodes such as $F_1$ 81, $F_2$ 88 in FIG. 13a.)

We claim:
1. A recognition system for preparing a recognition dictionary comprising:
    means for producing distribution data of a plurality of categories for each of a plurality of features from samples of patterns to be recognized;
    means responsive to said means for producing distribution data for providing the mean value and the standard deviation of each of the categories of each of said plurality of features;

means responsive to said means for providing the mean value and the standard deviation for summing for each of the features a number of combinations of pairs of the categories having a discreteness greater than a predetermined value; and means coupled to said means for summing for comparing the number of combinations of each feature for selecting as a highest priority one of the features of the categories to be recognized having the highest number of combinations.

2. A recognition system according to claim 1, wherein said means for summing sums combinations between two adjacent and discrete categories for each of said plurality of features.

3. A recognition system according to claim 1, further comprising means for providing an interdistribution distance, wherein when the mean value of a first category is larger than the mean value of the second category, said interdistribution distance is defined by the ratio of the difference between the lower limit of said second category as a function of dispersion of the category and the upper limlt of said first category as a function of dispersion of the category to the difference between either one of which is larger between the upper limit of said second category as a function of dispersion of the category and the upper limit of said first category as a function of dispersion of the category and either one which is smaller between the lower limit of said first category as a function of dispersion of the category and the lower limit of said second category as a function of dispersion of the category.

4. A recognition system in accordance with claim 3 wherein when the mean value of a first category is larger than the mean value of the second category, said interdistribution distance is defined by the ratio of the difference between the lower limit of said second category as a function of dispersion of the category and the upper limit of said first category as a function of dispersion of the category to the difference between either one of which is larger between the upper limit of said second category as a function of dispersion of the category and the upper limit of said first category as a function of dispersion of the class and either one which is smaller between the lower limit of said first category as a function of dispersion of the category and the lower limit of said second category as a function of dispersion of the category.

5. A recognition system in accordance with claim 3 wherein said second predetermined value is equal to said first predetermined value.

6. A recognition system in accordance with claim 3 wherein the pattern to be recognized is a set of characters including alphanumerical symbols and each of the features is information involving lightness and darkness of a contour of said characters.

7. A recognition system in accordance with claim 3 wherein the pattern to be recognized are objects having different shapes and each of the features is information involving lightness and darkness of a contour of the object.

8. A recognition system in accordance with claim 1 further comprising:

means comparing a value representing a distance in distribution between a pair of categories of said feature having the highest priority with a second predetermined value.

9. A recognition method for preparing a recognition dictionary comprising the steps:

producing distribution data of a plurality of categories for each of a plurality of features from samples of patterns to be recognized;

providing the mean value and standard deviation of each of the categories of each of the plurality of features in response to the distribution data;

summing for each of the features a number of combinations of pairs of the categories having a discreteness greater than a predetermined value in response to the mean value and standard deviation; and comparing the number of combinations of each feature for selecting as a highest priority one of the features of the categories to be recognized having the highest number of combinations in response to the summed number of combinations.

* * * * *